United States Patent
Nichols

(10) Patent No.: US 9,523,451 B1
(45) Date of Patent: Dec. 20, 2016

(54) UTILIZING A VISUAL INDICATOR TO DETERMINE SECURITY OF A PIPE FITTING

(71) Applicant: Elkhart Products Corporation, Sandenburgerlaan (NL)

(72) Inventor: Robert Nichols, Elkhart, IN (US)

(73) Assignee: ELKHART PRODUCTS CORPORATION, C/O AALBERTS INDUSTRIES N.V. (NL)

( * ) Notice: Subject to any disclaimer, the term of this patent is extended or adjusted under 35 U.S.C. 154(b) by 774 days.

(21) Appl. No.: 13/769,099

(22) Filed: Feb. 15, 2013

(51) Int. Cl.
    *F16L 25/00* (2006.01)
    *B05D 3/12* (2006.01)
    *B05D 5/10* (2006.01)

(52) U.S. Cl.
    CPC ............... *F16L 25/00* (2013.01); *B05D 3/12* (2013.01); *B05D 5/10* (2013.01)

(58) Field of Classification Search
    CPC .............................. F16L 47/22; F16L 13/0272
    See application file for complete search history.

(56) References Cited

U.S. PATENT DOCUMENTS

| | | | | | |
|---|---|---|---|---|---|
| 1,481,035 | A | * | 1/1924 | Stattmann | B65D 41/62 215/251 |
| 2,433,602 | A | * | 12/1947 | Coss | F16L 33/02 285/242 |
| 2,726,683 | A | * | 12/1955 | Steinbach | F16L 55/105 116/200 |
| 3,379,218 | A | * | 4/1968 | Conde | B29C 61/0616 138/168 |
| 3,572,091 | A | * | 3/1971 | McFarland | G01B 5/30 33/501.03 |
| 4,366,972 | A | * | 1/1983 | Franklin | B29C 47/021 156/244.15 |
| 4,655,159 | A | * | 4/1987 | McMills | B25B 23/14 116/212 |
| 4,744,328 | A | * | 5/1988 | Stevens | F16B 41/005 116/200 |
| 5,280,967 | A | * | 1/1994 | Varrin, Jr. | F16B 31/028 285/382.7 |

(Continued)

FOREIGN PATENT DOCUMENTS

| | | | |
|---|---|---|---|
| DE | 10200617184 B3 * | 11/2007 | ............ F16L 13/14 |
| FI | WO 9733121 A1 * | 9/1997 | ........... B29C 65/342 |

(Continued)

*Primary Examiner* — John Fitzgerald
(74) *Attorney, Agent, or Firm* — Shumaker, Loop & Kendrick, LLP

(57) ABSTRACT

A system comprising a visual element for indicating the security of a pipe fitting and associated method. The visual element is configured to adhere to an outer surface of a pipe fitting and disjoin from the outer surface of the pipe fitting according to a set of disjoining criteria. The criteria comprises at least one of application of a sufficient force at the outer surface of the pipe fitting to form a fluid-tight seal between the pipe fitting and another pipe and a circumferential change of the visual element greater than a threshold amount of circumferential change. The visual element may be placed on a pipe fitting into which a pipe is inserted, and the connection between the pipe fitting and the pipe may be secured. Determination of whether the pipe fitting and the pipe are properly connected is performed based on monitoring of the visual element.

18 Claims, 7 Drawing Sheets

(56) References Cited

U.S. PATENT DOCUMENTS

| | | | | |
|---|---|---|---|---|
| 5,660,417 A * | 8/1997 | Reeves | ............ | G01L 5/24 |
| | | | | 116/201 |
| 5,700,530 A * | 12/1997 | Van Beersel | ....... | B29C 53/8083 |
| | | | | 156/195 |
| 5,732,743 A * | 3/1998 | Livesay | ............ | B29C 73/10 |
| | | | | 138/99 |
| 6,059,908 A * | 5/2000 | Van Beersel | ....... | B29C 53/8083 |
| | | | | 138/144 |
| 6,244,804 B1 * | 6/2001 | Hodge | ............ | F16B 31/02 |
| | | | | 116/212 |
| 6,250,863 B1 * | 6/2001 | Kamentser | ............ | F16B 31/028 |
| | | | | 116/212 |
| 6,438,814 B1 * | 8/2002 | Seymour | ............ | F16L 19/061 |
| | | | | 285/249 |
| 7,730,846 B2 * | 6/2010 | Pett | ............ | A46B 15/0002 |
| | | | | 116/212 |
| 2008/0264327 A1 * | 10/2008 | Pett | ............ | A46B 15/0002 |
| | | | | 116/212 |
| 2009/0026764 A1 * | 1/2009 | Beckmann | ............ | F16L 13/141 |
| | | | | 285/382.7 |
| 2009/0127846 A1 * | 5/2009 | Dole | ............ | B21D 17/04 |
| | | | | 285/24 |
| 2009/0218814 A1 * | 9/2009 | Kern | ............ | F16L 13/141 |
| | | | | 285/382.2 |

FOREIGN PATENT DOCUMENTS

| | | | | |
|---|---|---|---|---|
| FI | WO 9841790 A1 * | 9/1998 | ............ | F16L 33/20 |
| GB | 1361372 A * | 7/1974 | ............ | F16L 19/10 |

* cited by examiner

Label Front
Perforations Not Shown

UTILIZING A VISUAL INDICATOR TO DETERMINE SECURITY OF A PIPE FITTING

TECHNICAL FIELD

The present disclosure generally relates to pipe fittings. Specifically, the present disclosure relates to utilizing a visual indicator to detect faults in pipe fittings.

BACKGROUND

Pipes are fitted or joined with one another in industry to, among other things, connect, install, or repair piping systems. A fitting between two pipes typically includes a pipe being inserted into another pipe having a portion of larger diameter than the pipe being inserted. Various techniques may be used to secure the connection between the pipes, but a common technique is to use a pressing tool to deform the portion of larger diameter by compression against the inserted pipe.

A drawback of the pressing tool technique is that after pipes have been fitted, there are not many accurate ways to determine whether the pipes were securely connected. One approach used to identify unsecured pipe fittings is a fluid test technique where a pipe fitting is tested under pressure by circulating fluid through the pipes and inspecting the pipe fitting for leaks. This approach is often inaccurate. Further, the fluid test technique is often problematic because of the fluid that leaks from the pipe fittings. Because the fluid test technique requires that the pipe network be connected prior to testing, it is not possible to fix the fitting without first leaking the test fluid. The aforementioned drawbacks of the fluid test technique make it a cumbersome process for testing the security of a pipe fitting connection.

BRIEF SUMMARY OF THE INVENTION

Embodiments of the present invention are directed to improved pipe fitting security detection schemes using a visual indicator. One embodiment may include a system for providing a visual indication of the security of a pipe fitting connection. The system may include a visual element configured to adhere to an outer surface of a first pipe fitting. The visual element may be configured to undergo a threshold amount of circumferential change while remaining adhered to the outer surface of the first pipe fitting. In one embodiment, the threshold amount of circumferential change may be indicative of a circumference change of the first pipe fitting associated with achieving a secure pipe fitting between the first pipe fitting and a second pipe.

According to another embodiment, the visual element may also be configured to disjoin from the outer surface of the first pipe fitting in response to a set of disjoining criteria. The set of disjoining criteria may include at least one of application of a sufficient force at the outer surface of the first pipe fitting to form a fluid-tight seal between the first pipe fitting and the second pipe and a circumferential change of the visual element greater than a threshold amount of circumferential change.

In an embodiment, the visual element may be placed along a flange portion of the first pipe fitting and may be constructed from a polymer material sufficient to adapt to the contour, and the circumferential change, of the first pipe fitting. The visual element may also include a pressure sensitive adhesive material sufficient to adhere to the outer surface of the first pipe fitting and disjoin from the outer surface of the first pipe fitting according to the set of disjoining criteria. The visual element may further include perforated sections spaced along the visual element sufficient to adjust the length of the visual element to match the circumference of the outer surface of the first pipe fitting.

A further embodiment my include a method for providing a visual indication of security of a pipe fitting. The method may include placing a visual element on an outer surface of a first pipe fitting. The visual element may be configured to adhere to the outer surface of the first pipe fitting. The visual element may also be configured to disjoin from the outer surface of the first pipe fitting according to a set of disjoining criteria that may include at least one of application of a sufficient force at the outer surface of the first pipe fitting to form a fluid-tight seal between the first pipe fitting and the second pipe and a circumferential change of the visual element greater than a threshold amount of circumferential change. The method for providing a visual indication of security of a pipe fitting may also include inserting a second pipe into the first pipe fitting, and securing a connection between the first pipe fitting and the second pipe. The method may further include determining whether the first pipe fitting and the second pipe are properly connected based on monitoring of the visual element.

According to an embodiment, placing the visual element on the outer surface of the first pipe fitting may include placing the visual element along a flange portion of the first pipe fitting. Furthermore, determining whether the first pipe fitting and the second pipe are properly connected may include identifying the location of the visual element after securing the connection between the first pipe fitting and the second pipe. If the visual element remains adhered to the first pipe fitting, then the first pipe fitting and the second pipe may not be properly connected. If the visual element is disjoined from the first pipe fitting, then the first pipe fitting and the second pipe may be properly connected. In an embodiment, securing the connection between the first pipe fitting and the second pipe may include pressing.

According to one embodiment, the visual element may be a label, and the label may be uniquely made to be placed around a pipe fitting without breaking, falling apart, getting loose, etc. as long as the pipe fitting has not been pressed. Upon pressing of the pipe fitting to a second pipe with a pressing tool, the unique label may indicate whether the connection between the pipe fitting and the second pipe is secure or if the connection requires further inspection.

One embodiment may include an apparatus for providing a visual indication of security of a pipe fitting. The apparatus may include a flat strand of a flexible material with a front surface and a back surface. The embodiment may also include a first row of perforations along a line perpendicular to a length-wise side of the flat strand of flexible material. Each perforation of the first row of perforations may be evenly spaced apart from adjacent perforations along the perpendicular line. The embodiment may further include an adhesive material placed at a plurality of locations that are evenly spaced apart on the back surface of the flat strand. A first plurality of sections on the front surface of the flat strand may be designated for placing general information. These sections designated for general information may be evenly spaced apart on the front face. A second plurality of sections may be designated for placing instructional information. Each of these designated sections may be placed between adjacent sections designated for placing general information.

Another embodiment may include a second row of perforations and a third row of perforations. The second row of perforations and the third row of perforations may be placed in parallel with the first row of perforations, and each perforation in the second and third rows of perforations may be evenly spaced apart from adjacent perforations. Each of the first, second, and third rows of perforations may be separated from one another by a substantially equal distance.

According to an embodiment, the flexible material may be a polymer and the adhesive material may be pressure sensitive. According to another embodiment, the specific polymer may be polyester, while in yet another embodiment the flat strand of flexible material may be paper and may be rectangular in shape. Furthermore, the general information and the instructional information may each be in the form of at least one of: text and a figure.

Another embodiment may include a method of making a visual indicator to indicate the security of a pipe fitting. The method may include fabricating a continuous flat strand of a flexible material with a front surface and a back surface and piercing a first row of perforations through a line perpendicular to a length-wise side of the flat strand of flexible material. Each perforation of the first row of perforations may be evenly spaced apart from adjacent perforations. The method may also include coating the flexible material with an adhesive material at a plurality of locations that are evenly spaced apart on the back surface. The method may further include placing general information at a first plurality of sections evenly spaced apart on the front face, and placing instructional information at a second plurality of sections, where each section of the second plurality of sections may be placed between adjacent sections with general information.

The method may also, in an embodiment, include forming the flat strand of flexible material into a rectangular shape and piercing a second row of perforations and a third row of perforations through the flat strand of flexible material, where the second row of perforations and the third row of perforations may be placed in parallel with the first row of perforations. Each perforation of the second and third rows of perforations may be evenly spaced apart from adjacent perforations, and each of the first, second, and third rows of perforations may be a substantially equal distance away from one another.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present invention, reference is now made to the following descriptions taken in conjunction with the accompanying drawings, in which.

DETAILED DESCRIPTION

The concepts described herein provide a method and system for accurately detecting the security of a pipe fitting connection by providing a visual indication of the security of the fitting at the time of installment. According to one aspect, a visual element may be affixed at a large diameter portion of a pipe fitting that is to be crimped along the pipe fitting to another pipe. The visual element may be configured to withstand a threshold amount of circumferential change while remaining adhered to the large diameter pipe fitting. The visual element may include an adhesive material on its back surface to effectuate sufficient adhesion of the visual element to the portion of the pipe fitting that is crimped or pressed to secure the fitting. On the front surface (i.e., outer surface) of the visual element, information may be placed throughout the visual element to communicate information to the pipe installer.

According to another aspect, the visual element may also be configured to, upon application of a sufficient force at the outer surface of the pipe fitting to form a fluid-tight seal between the pipe fitting and a pipe, disjoin from the pipe fitting to indicate that the pipe fitting has been securely connected to the pipe. The visual element may be constructed out of a flexible material to adapt to the contour, and the circumferential change, of the pipe fitting. The visual element may also include perforated sections spaced along the visual element to adjust the length of the visual element to match the circumference of the large diameter pipe fitting.

Advantageously, the concepts may enable a user to determine whether the pipe fitting is adequately secured to another pipe. For example, the visual element may serve as a visual indication that two or more pipes have been securely joined to one another with a pipe fitting where the visual element is no longer attached to the large diameter portion of the crimped pipe fitting. In contrast, the visual element may also serve as a visual indication that the pipe fitting is not secured to another pipe if the visual element is still attached to large diameter portion of the crimped pipe fitting after connection.

Figure 1A:
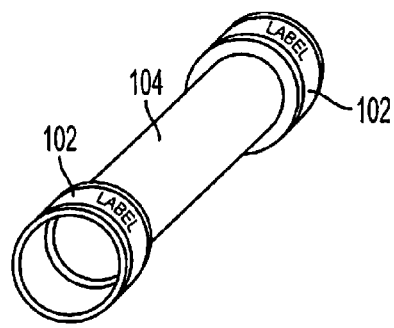
FIGS. 1A-1E illustrate a system for providing a visual indication of the security of a pipe fitting according to an embodiment.
Figure 1B:
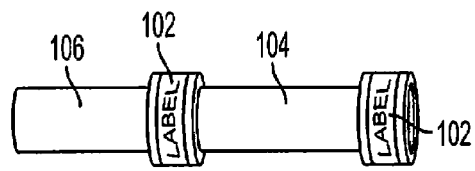
Figure 1C:
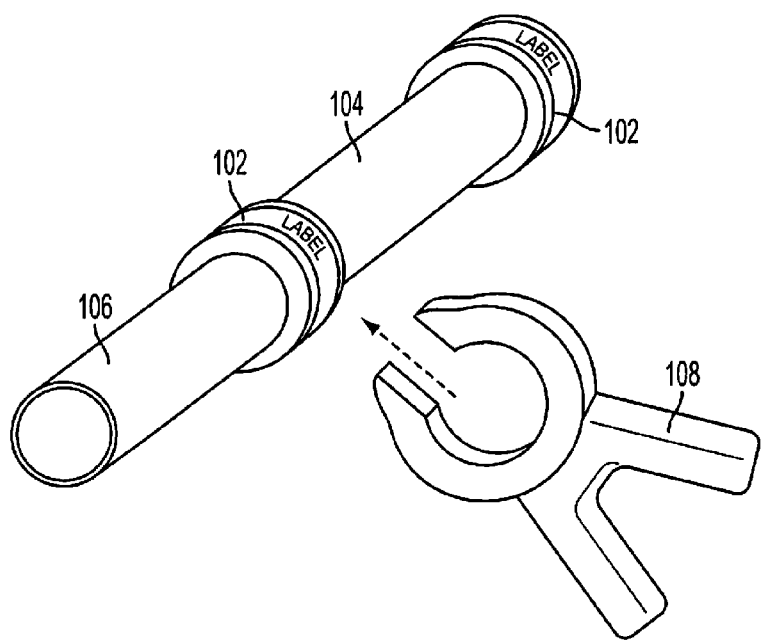
Figure 1D:
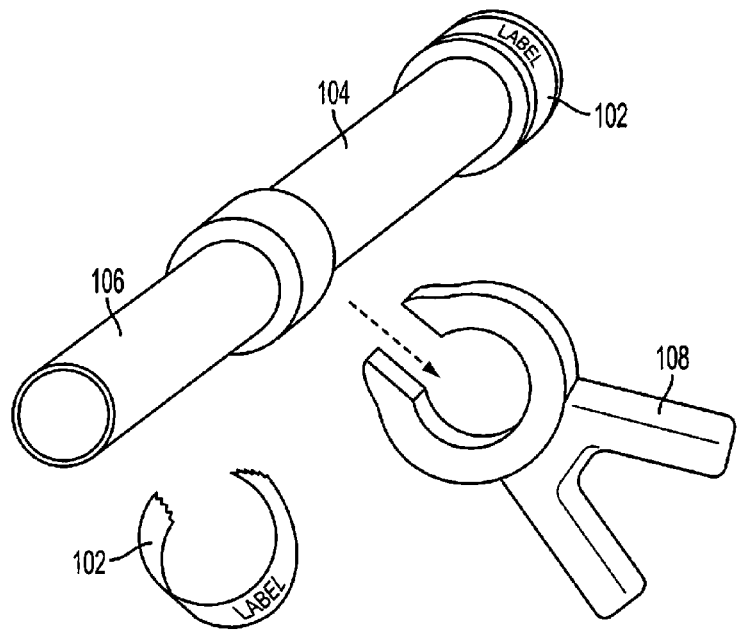

FIGS. 1A-1E illustrate a system for providing a visual indication of the security of a pipe fitting according to an embodiment. A visual element 102 may be configured to adhere to an outer surface of a first pipe fitting 104. The first pipe fitting 104 may include one or more large diameter portions onto which one or more visual elements 102 may be adhered. As an example, the first pipe fitting 104 in FIG. 1A includes two large diameter portions, and therefore includes two visual elements 102. The visual element 102 may be configured to undergo a threshold amount of 1) circumferential change, and/or 2) pressure applied by a pressing tool or other applied force while remaining adhered to the outer surface of the first pipe fitting 104. As shown in FIG. 1C, the circumferential change may be a result of clamping of the large diameter portion of the first pipe fitting 104 to a second pipe 106 with a pressing tool 108. According to one embodiment, the threshold amount of circumferential change may be indicative of a circumference change of the first pipe fitting 104 associated with achieving a secure fitting between the first pipe fitting 104 and the second pipe 106. For example, upon application of a force at the outer surface of the large diameter portion of the first pipe fitting 104 that is within the threshold amount of circumferential change, the visual element 102 may remain adhered to the first pipe fitting 104, as shown in FIG. 1D.

Figure 1E:
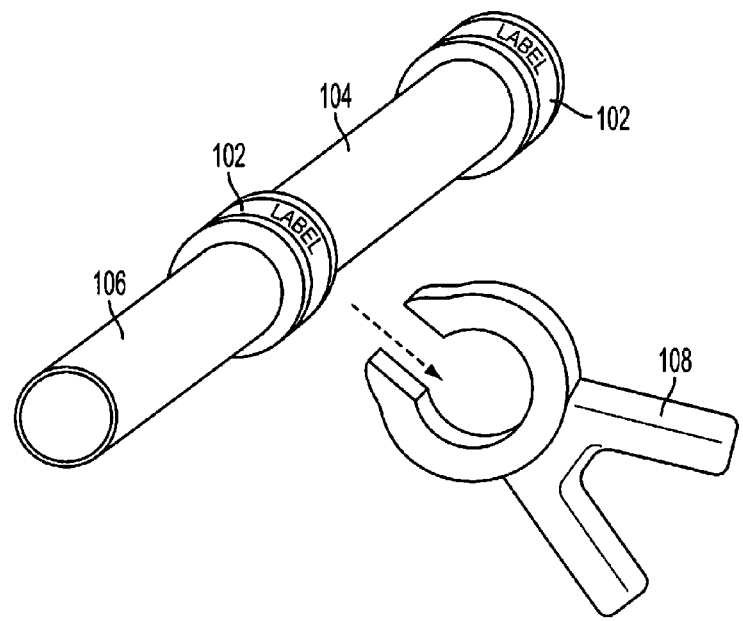

The visual element 102 may also be configured to disjoin from the outer surface of the first pipe fitting 104 in response to a set of disjoining criteria. For example, as shown in FIG. 1E, the visual element 102 may disjoin from the outer surface of the first pipe fitting 104 upon at least one of application of a sufficient force at the outer surface of the first pipe fitting 104 to form a fluid-tight seal between the first pipe fitting 104 and the second pipe 106 and a circumferential change of the visual element 102 greater than the threshold amount of circumferential change. According to an embodiment, the visual element 102 may include an adhesive material, which may be pressure sensitive, sufficient to adhere to the outer surface of the first pipe fitting 104 and disjoin from the outer surface of the first pipe fitting 104 according to the set of disjoining criteria.

Accordingly, the visual element 102 may be primarily responsive to applied pressure, such that it becomes unadhered to the pipe surface upon application of a threshold amount of pressure. The threshold amount of pressure may be determined before the fitting, and may vary based on system requirements, the type of press tool being used, the size of the pipe fitting, and the like. For example, in one embodiment, the threshold amount of pressure may be approximately 7,190 pounds-force, which may be sufficient pressure to secure a pipe fitting to a pipe with an additional safety factor. In any event, the visual element 102 may provide at least two criteria (threshold circumferential change and applied pressure), separately or in combination, as a means to determine the security of the pipe fitting or joint.

Another feature of the visual element 102 may also include perforated sections spaced along the visual element 102 sufficient to adjust the length of the visual element 102 to match the circumference of the outer surface of the first pipe fitting 104. Furthermore, the visual element 102 may be constructed out of a flexible material, such as a polymer material, to adapt to the contour of, the circumferential change of, and applied pressure to, the first pipe fitting 104. In one embodiment, the visual element 102 may be placed along a flange portion of the first pipe fitting 104.

Figure 2:
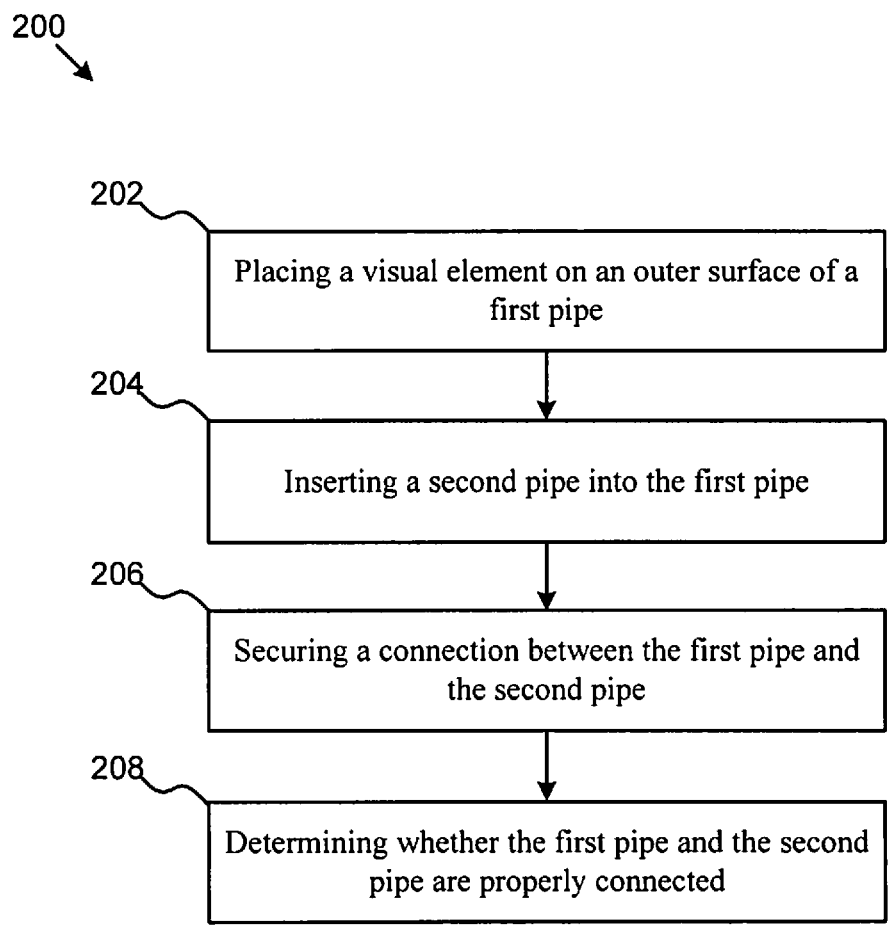
FIG. 2 illustrates a method for providing a visual indication of security of a pipe fitting according to an embodiment.

FIG. 2 illustrates a method 200 for providing a visual indication of security of a pipe fitting according to an embodiment using the system of FIGS. 1A-1E. At block 202, a visual element 102 may be placed on the first pipe fitting 104, which may be a flange portion of the first pipe fitting 104, as shown in FIG. 1A. In certain embodiments, the first pipe may be a pipe fitting. Furthermore, the pipe fitting 104 may include one or more large diameter portions onto which one or more visual elements 102 may be adhered. As an example, the pipe fitting 104 in FIG. 1A includes two large diameter portions, and therefore includes two visual elements 102. At block 204, a second pipe 106 may be inserted into the first pipe fitting 104 with visual element 102, as shown in FIG. 1B. The visual element 102 may be placed on the pipe fitting 104 before or after the second pipe 106 is inserted into the first pipe fitting 104. At block 206, the connection between the first pipe fitting 104 and the second pipe 106 may be secured, as shown in FIG. 1C. Various tools and techniques may be used to secure the connection between the first pipe fitting 104 and the second pipe 106. In one embodiment, as shown in FIG. 1C, a pressing tool 108 may be used to press the first pipe fitting 104 onto the second pipe 106 to secure the connection between the first pipe fitting 104 and the second pipe 106. When a pressing tool is used, the jaws of the pressing tool 108 may be placed around the visual element 102 surrounding the first pipe fitting 104. Upon completion of the pressing of the first pipe fitting 104 to the second pipe 106, the pressing tool 108 may be removed, as shown in FIGS. 1D and 1E. At block 208, the method 200 may include determining whether the first pipe fitting 104 and the second pipe 106 are properly connected based on monitoring of the visual element 102. To determine whether the first pipe fitting 104 and the second pipe 106 are properly connected, the method 200 may further include identifying the location of the visual element 102 after the pressing by the pressing tool 108 has been completed. In one embodiment, as shown in FIG. 1D, the visual element 102 may break off as a result of the pressing and no longer remain on the pipe fitting 104. If the visual element 102 is disjoined from the first pipe fitting 104 after the pressing tool 108 has been removed, as shown in FIG. 1D, then the first pipe fitting 104 and the second pipe 106 may be properly connected.

According to an embodiment, the visual element 102 may break away or detach from the first pipe fitting 104 as a result of the deformation of the first pipe fitting 104 caused by the pressing tool 108. The pressing tool 108 may deform the first pipe fitting 104 by crimping or otherwise decreasing the circumference of the large diameter portion first pipe fitting 104 to make contact with the second pipe 106, thereby securing a connection between the first pipe fitting 104 and the second pipe 106. In an embodiment in which the visual indicator 102 is made of polyester, the material properties of the visual indicator 102 may hinder the visual element 102 from shrinking with the first pipe fitting 104 circumference shrinking. Therefore, as the first pipe fitting 104 shrinks, the visual indicator 102 breaks off because it cannot shrink with the first pipe fitting 104 to which it is attached.

According to another embodiment, as shown in FIG. 1E, the visual indicator 102 may remain adhered to the first pipe fitting 104 after the pressing by the pressing tool 108 has been completed. If the visual indicator 102 remains adhered to the first pipe fitting 104 after the pressing tool 108 has been removed, as shown in FIG. 1E, then the first pipe fitting 104 and the second pipe 106 may not be properly connected and/or require further inspection.

Figure 3:
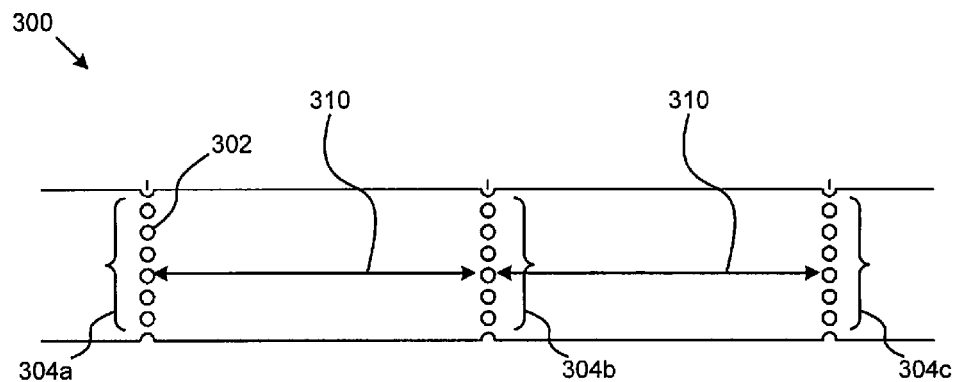
FIG. 3 illustrates a detailed view of a visual indicator according to an embodiment.

According to an embodiment, the visual element 102 may be a uniquely configured label. The label may be placed on pipe fittings, e.g., during manufacture of the pipe fittings for a variety of purposes, including product identification and to provide warnings or instructions. However, as will be discussed in more detail, according to a preferred embodiment, the label may be uniquely created for placement on a pipe fitting to assist in the detection of flawed pipe fitting connections. FIG. 3 illustrates a detailed view of a label 300 that may serve as the visual element according to an embodiment. The label 300 may be a relatively flat or textured strand of flexible material with a front surface and a back surface. The label 300 may be affixed to an item, on which is printed textual or graphical information, or the label 300 may be printed directly on the item. According to an embodiment, the flexible material may be paper, polymer, cloth, metal, or other material. In a preferred embodiment the flexible material is a polymer such as, e.g., polyester.

The label 300 may include a first row of perforations 304a along a line perpendicular to the length-wise edges of the label 300. Each perforation 302 of the first row of perforations 304a may be evenly spaced apart from adjacent perforations along the perpendicular line. In another embodiment, the label 300 may also include a second row of perforations 304b and a third row of perforations 304c. According to an embodiment, each of the rows of perforations 304a, 304b, and 304c may be placed in parallel with respect to one another and may be separated from one another by a substantially equal distance 310. As with the first row of perforations 304a, each perforation of the second and third rows of perforations 304b, 304c may also be evenly spaced apart from adjacent perforations. Label 300 may comprise any number of rows of perforations 304a-304n, however, as will be described, the arrangement of each row of perforations 304 with respect to one another and the label 300 is such that it enables label 300 to provide an appropriate balance between adhesion to a pipe fitting 104 and breaking upon sufficient applied pressure or circumferential change so that label 300 breaks away from pipe fitting 104 upon a secure fitting thereof. For example, in one preferred embodiment, each row of perforations 304 may include a total of 8 perforations evenly spaced apart. Furthermore, each perforation may measure 0.04 inches in diameter. The parameters specified in this embodiment are such that they allow the label 300 to provide between 10 pounds-force and 14 pounds-force of tensile strength. However, the parameters may be slightly modified to allow the label 300 to provide between 6 pounds-force and 18 pounds-force of tensile strength. Therefore, in one embodiment, a label 300 having tensile strength from 10 pounds-force to 14 pounds-force may be optimal for providing the label 300 the strength to withstand handling and enough slack to break under the pressure of a crimping tool, while in another embodiment, a label 300 having tensile strength from 6 pounds-force to 18 pounds-force may be optimal for providing the label 300 the strength to withstand handling and enough slack to break under the pressure of a crimping tool. Those skilled in the art should appreciate that many rows of perforations separated by various distances and providing for various amounts of tensile strength are available without departing from the spirit and scope of the disclosure as set forth in the appended claims.

Figure 4:
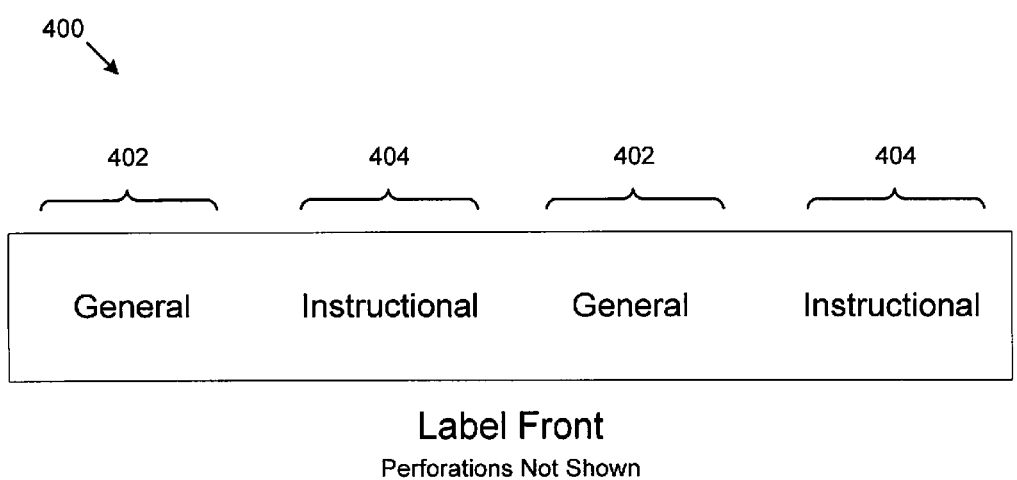
FIG. 4 illustrates a front surface of a visual indicator according to an embodiment.

FIG. 4 illustrates a front surface of a visual element 400 according to an embodiment. Although the plurality of perforations 304a, 304b, and 304c are present in label 400, label 400 does not show the perforations. According to an embodiment, the label 400 may be rectangular in shape, and may include a plurality of general information sections 402. The general information sections 402 may be designated sections evenly spaced apart on the front surface of the label 400 where general information may be placed. The general information placed in the general information sections 402 may include branding text or graphics, product identification text or graphics, and the like. The general information placed in the general information sections 402 may be placed in forms other than text, such as figures. Each general information section 402 may have general information in a different form. For example, a first general information section may have general information in the form of text while a second general information section may have general information in the form of a figure.

According to another embodiment, the visual element 400 may also include a plurality of instructional information sections 404. The instructional information sections 404 may be present in some embodiments, while in other embodiments the instructional information sections may not be present 404. When instructional information is included, each instructional information section 404 may be placed between adjacent general information sections 402, and may be designated for instructions. The instructions placed in instructional information sections 404 may be placed in forms other than text, such as figures. Each instructional information section 404 may have instructions in a different form. For example, a first instructional information section may have instructions in the form of text while a second instructional information section may have instructions in the form of a figure.

Figure 5:
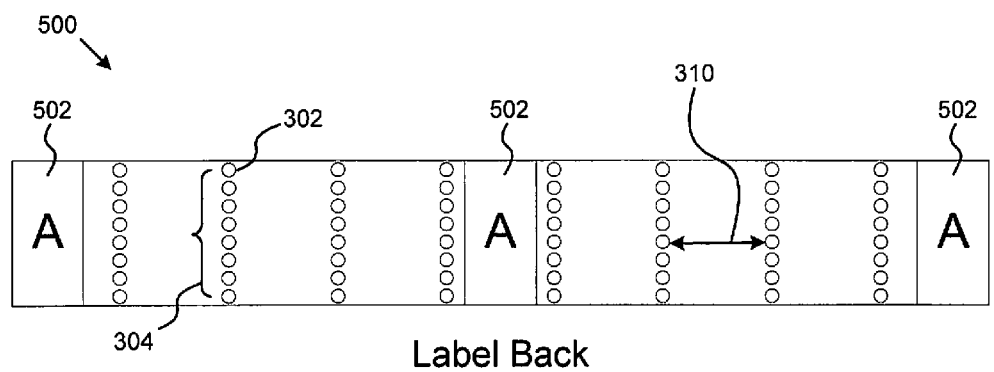
FIG. 5 illustrates a back surface of a visual indicator according to an embodiment.

FIG. 5 illustrates a back surface of a visual element according to an embodiment. The visual element 500 may include an adhesive material 502 placed at a plurality of locations that are evenly spaced apart along the back surface of the visual element 500. In one embodiment, the adhesive material 502 may be pressure sensitive while in another embodiment the adhesive material may be wet glue. For example, in one embodiment, the adhesive material 502 may be 3M™ double-sided adhesive tape, and the adhesive material 502 may be present only in the areas marked with an "A" in FIG. 5. Furthermore, by ensuring that no adhesive material 502 is located outside of the areas designated for adhesive material 502, an optimal adhesion between the visual element 500 and a pipe fitting may be achieved such that the visual element 500 may disjoin from the pipe fitting with ease according to a set of disjoining criteria, such as the disjoining criteria disclosed in FIG. 1.

Figure 6:
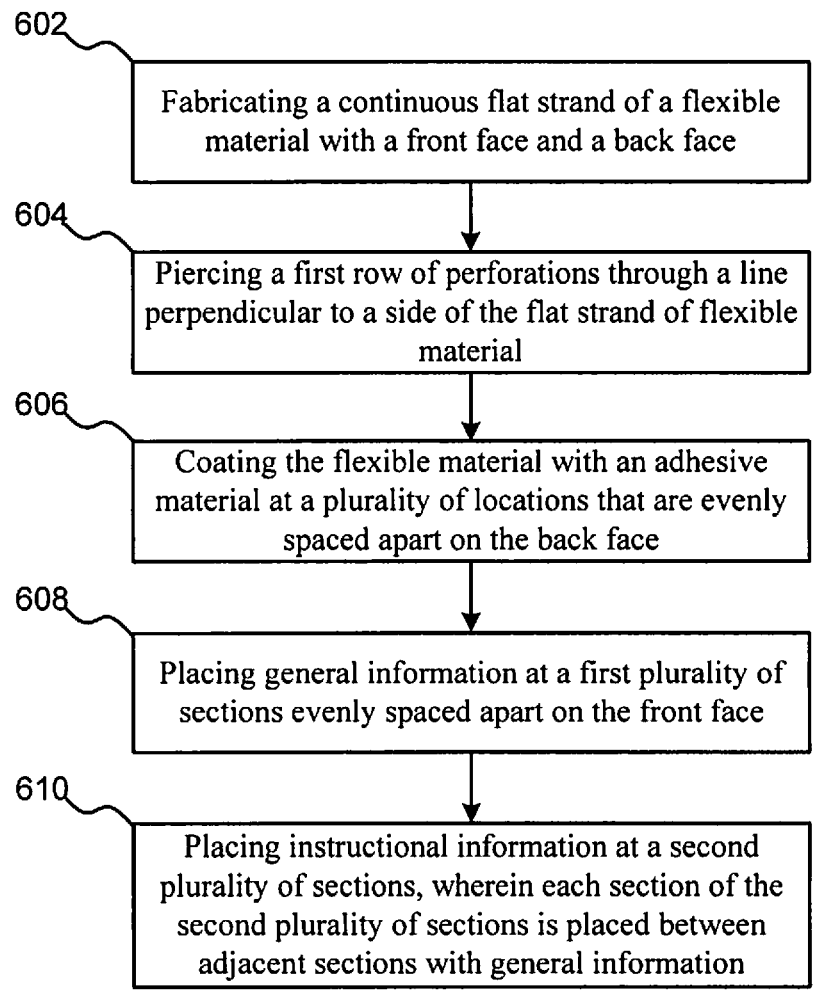
FIG. 6 illustrates a method of making a visual indicator according to an embodiment.

FIG. 6 illustrates a method of making a visual element according to an embodiment. The method may include, at block 602, fabricating a continuous strand of a flexible material with a front surface and a back surface. At block 604, the method may also include piercing a first row of perforations through a line perpendicular to a side of the flat strand of flexible material. Each perforation of the first row of perforations may be evenly spaced apart from adjacent perforations. The method may further include, at block 606, coating the flexible material with an adhesive material at a plurality of locations that are evenly spaced apart on the back surface of the flat strand of flexible material. At block 608, general information may be placed at a first plurality of sections evenly spaced apart on the front face, and, at block 610, instructional information may be placed at a second plurality of sections. Each section of said second plurality of sections may be placed between adjacent sections with general information.

According to an embodiment, the method of FIG. 6 may also include forming the flat strand of flexible material into a rectangular shape, and piercing a second row of perforations and a third row of perforations through the flat strand of flexible material. Each of the rows of perforations may be placed in parallel with respect to one another and may be separated from one another by a substantially equal distance.

Furthermore, each perforation of the second and third rows of perforations may also be evenly spaced apart from adjacent perforations.

The inclusion of rows of perforations when making the improved labels allows a label to be adjusted to fit around pipe fittings of any size when manufactured. The pipe fittings may be made of a plurality of materials. For example, in one embodiment, a pipe fitting to which a label may be applied may be a copper pipe fitting. The label, when fabricated, may extend indefinitely with the features described in this disclosure repeated along the length of the label. The length of the fabricated label may be specified automatically or manually. To adjust the length of a label so as to fit the circumference of a pipe fitting, the label may be detached at a row of perforations such that the detached portion of the label creates a label with a length that may be similar to the circumference of the pipe fitting to which the label is to be attached.

Figure 7A:
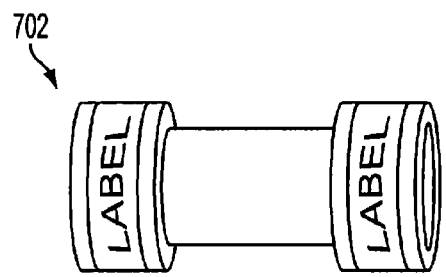
FIGS. 7A-7C illustrate alternative arrangements that include a visual indicator on a pipe fitting according to an embodiment.
Figure 7B:
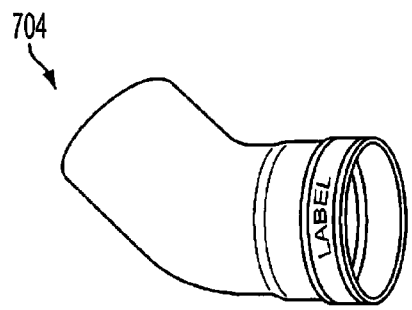
Figure 7C:
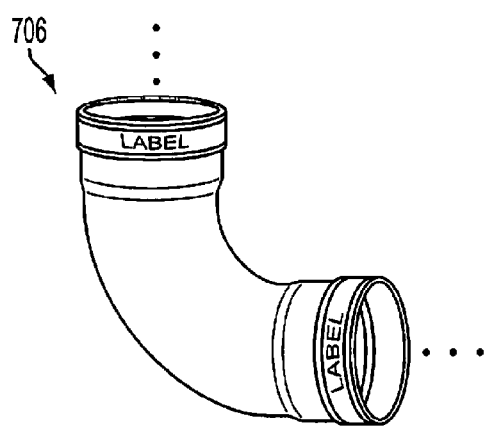

FIGS. 7A-7C illustrate alternative arrangements that include a visual indicator on a pipe fitting according to an embodiment. For example, in FIG. 7A two visual elements may be placed on the large diameter portions on the distal ends of the pipe fitting. As a second example, in FIG. 7B a visual element may be placed on a large diameter portion of a pipe fitting that is angled. As a third example, in FIG. 7C two visual elements may be placed on the large diameter portions on the distal ends of a pipe fitting that is angled to create a near 90 degrees angle. Those skilled in the art should appreciate that many different arrangements of pipe fittings with visual indicators to indicate the security of pipe fittings are available without departing from the spirit and scope of the disclosure as set forth in the appended claims.

Although a preferred embodiment of the present invention has been described with reference to the steps of FIGS. 2 and 6, it should be appreciated that operation of the present invention is not necessarily limited to the particular steps and/or the particular order of the steps illustrated in FIGS. 2 and 6. For example, in FIG. 2, the actions at block 204 may be performed before the actions at block 202.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present processes, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An article adapted for providing a visual indication of the security of a sealing joinder between an end portion of a second pipe fitting inserted into an end portion of a first pipe fitting, comprising:
   (a) an elongate flexible tape for being secured around an outer annular surface of the first pipe fitting and overlying the end portion of the first pipe fitting when the second pipe fitting is inserted into the end portion of the first pipe fitting; and
   (b) the tape having a tensile strength predetermined to cause the tape to separate into two or more tape segments upon pressure being exerted circumferentially against the outer annular surface of the first pipe fitting overlying the inserted end portion of the second pipe fitting to effect a secure sealing joinder between the first pipe and second pipe fitting.

2. The article of claim 1, wherein the tape includes an adhesive on an inner surface.

3. The article of claim 1, wherein the tape comprises a flexible polymer material.

4. The article of claim 1, wherein the tape is adapted to fit around a flange portion of the second pipe fitting.

5. The article of claim 1, wherein the tape has a tensile strength of between 6 and 18 pounds-force (26.7 and 80 Newtons).

6. The article of claim 1, wherein the tape has a tensile strength of between 10 and 14 pounds-force (44.5 and 62.3 Newtons).

7. The article of claim 1, wherein the tape includes at least one row of perforations defining a weakness zone along which the tape will separate extending between first and second side edges of the tape.

8. The article of claim 1, wherein the tape includes at least one row of perforations defining a weakness zone along which the tape will separate extending perpendicularly between first and second side edges of the tape.

9. The article of claim 1, wherein the tape includes a plurality of rows of perforations defining a weakness zone along which the tape will separate extending between first and second side edges of the tape.

10. The article of claim 1, wherein the tape includes a plurality of rows of perforations defining a weakness zone along which the tape will separate extending perpendicularly between first and second side edges of the tape.

11. The article of claim 1, wherein the tape includes a plurality of spaced-apart rows of perforations defining respective weakness zones along which the tape will separate extending between first and second side edges of the tape.

12. The article of claim 1, wherein the tape comprises an endless band.

13. An article adapted for providing a visual indication of the security of a sealing joinder between an end portion of a second pipe fitting inserted into an end portion of a first pipe fitting, comprising:
   (a) an elongate flexible tape for being secured around an outer annular surface of a flange portion of the second pipe fitting when the second pipe fitting is inserted into the end portion of the first pipe fitting;
   (b) the flexible polymer tape having a tensile strength predetermined to cause the tape to separate into two or more tape segments upon pressure being exerted circumferentially against the outer annular surface of the first pipe fitting overlying the inserted end portion of the second pipe fitting to effect a secure sealing joinder between the first pipe and second pipe fitting;
   (c) an adhesive on an inner surface of the tape; and
   (d) at least one row of perforations defining a weakness zone along which the tape will separate extending between first and second side edges of the tape forming a weakness zone along which the tape is adapted to separate.

14. The article of claim 13, wherein the tape has a tensile strength of between 6 and 18 pounds-force (26.7 and 80 Newtons).

15. The article of claim 13, wherein the tape has a tensile strength of between 10 and 14 pounds-force (44.5 and 62.3 Newtons).

16. The article of claim 13, wherein the tape comprises an endless band.

17. The article of claim 13, wherein the tape includes a plurality of rows of perforations defining a weakness zone along which the tape will separate extending perpendicularly between first and second side edges of the tape.

18. The article of claim 17, wherein the plurality of rows of perforations are equally spaced-apart from each other along a predetermined length of the tape.

\* \* \* \* \*